US012310369B1

(12) United States Patent
Mitchell

(10) Patent No.: US 12,310,369 B1
(45) Date of Patent: May 27, 2025

(54) ANTI-MICROBIAL TREATMENT FOR SEEDS AND CROPS

(71) Applicant: Agro Tech Fungicide Inc., Oakley, ID (US)

(72) Inventor: Bruce Mitchell, Oakley, ID (US)

(73) Assignee: Agro Tech Fungicide Inc., Oakley, ID (US)

( * ) Notice: Subject to any disclaimer, the term of this patent is extended or adjusted under 35 U.S.C. 154(b) by 0 days.

(21) Appl. No.: 19/017,364

(22) Filed: Jan. 10, 2025

Related U.S. Application Data

(60) Provisional application No. 63/551,648, filed on Feb. 9, 2024.

(51) Int. Cl.
*A01N 59/06* (2006.01)
*A01N 47/14* (2006.01)
*A01P 3/00* (2006.01)

(52) U.S. Cl.
CPC ............. *A01N 59/06* (2013.01); *A01N 47/14* (2013.01); *A01P 3/00* (2021.08)

(58) Field of Classification Search
CPC ......... A01N 47/14; A01N 59/06; A01N 25/08
See application file for complete search history.

(56) References Cited

U.S. PATENT DOCUMENTS 2,092,308 A * 9/1937 Gnadinger ............. A01N 53/00 514/65
5,783,411 A 7/1998 Schisler et al.
2017/0360046 A1* 12/2017 Stürm .................... A01N 25/14
2020/0296963 A1 9/2020 Weiss et al.

FOREIGN PATENT DOCUMENTS

CN 106922707 A 7/2017
WO 2014170894 A1 10/2014

OTHER PUBLICATIONS

HCAPLUS abstract 1974:459348 (1974).*
Machine translation of CN 103229779 (Sep. 17, 2014).*
USPTO acting as International Searching Authority, "International Search Report and Written Opinion," International No. PCT/US2025/015143, Apr. 15, 2025.
Chittem, K, et al., "Efficacy of precipitated calcium carbonate in managing fusarium root rot of field pea," Phytoparasitica 44:295-303 (2016).

* cited by examiner

*Primary Examiner* — John Pak
(74) *Attorney, Agent, or Firm* — DENTONS Durham Jones Pinegar

(57) ABSTRACT

An antimicrobial treatment for preventing or treating a pathogenic disease in a crop comprises spent lime. The spent lime may be used alone, as a carrier for an antimicrobial agent, or in combination with one or more other carriers for an antimicrobial agent. A method for preventing or treating pathogenic disease in a crop includes applying an antimicrobial treatment that includes spent lime to the crop. The antimicrobial treatment may be applied to seeds used to grow the crop and/or to plants of the crop.

15 Claims, 5 Drawing Sheets

ANTI-MICROBIAL TREATMENT FOR SEEDS AND CROPS

CROSS-REFERENCE TO RELATED APPLICATION

A claim for priority to the Feb. 9, 2024 filing date of U.S. Provisional Patent Application No. 63/551,648, titled DRY ROT TREATMENTS FOR POTATOES AND OTHER TUBERS ("the '648 Provisional Application") is hereby made. The entire disclosure of the '648 Provisional Application is hereby incorporated herein.

TECHNICAL FIELD

This disclosure relates generally to treatments for tubers (e.g., potatoes, yams, sweet potatoes, cassava, jicama, taro, ginger, etc.). More specifically, this disclosure relates to treatments that prevent the decay of tubers. Even more specifically, this disclosure relates to the treatment of tubers with compositions that include spent lime.

RELATED ART

Dry rot disease is an ever-present threat to the production of a variety of tubers, including potatoes. Dry rot disease may be caused by a fungus known as *Fusarium*. Various species of *Fusarium* are found in soil. Thirteen species of *Fusarium* are known to cause dry rot disease in potatoes, with *Fusarium sambucinum* being the most problematic in the United States of America. As potatoes and other tubers are grown, harvested, and stored, their skins may be damaged. Cuts and other damage in the skins of tubers can also provide an opening for *Fusarium* in the surrounding environment (e.g., soil, on the skins of adjacent tubers, etc.) to enter the tuber. The flesh of the tuber then provides the *Fusarium* with the nutrients it needs to reproduce and infect other tubers.

Dry rot disease is a particular problem with seed potatoes, which may have *Fusarium* on their skins. When a seed potato is cut into pieces prior to planting, *Fusarium* on the skin of the seed potato or in the soil in which the pieces of seed potato was grown may infect the seed potato. When pieces of the seed potato are infected by *Fusarium*, they may suffer from dry rot disease, which prevents infected pieces of the seed potato from spouting or reduces plant growth and, thus, from providing a crop of healthy potatoes.

Dry rot disease is also a problem when potatoes are stored in the fall (i.e., autumn). Potatoes are prone to damage during harvesting, where they may be cut or otherwise injured by sharp edges of harvesting equipment, dropped, or otherwise subject to damage as they are handled. When the newly harvested potatoes are stored, they are kept in conditions that are ideal for *Fusarium* growth, which may enable the *Fusarium* to spread among the stored potatoes, which can cause dry rot disease in the potatoes before they are removed from storage and used to seed a new crop, sold to processors, or sold as "fresh" potatoes.

Overall, *Fusarium* can decrease potato crop yields significantly. When not controlled, some crops have been completely lost.

Mancozeb has been used to treat *Fusarium* dry rot. Mancozeb is a dithiocarbamate (e.g., zinc manganese ethylene-bis-dithiocarbamate) non-systemic agricultural fungicide that includes a combination of the dithiocarbamates maneb and zineb and is marketed under the trademarks Penncozeb, Trimanoc, Vondozeb, Dithane, Manzeb, Nemispot, and Manzane.

While mancozeb is effective against *Fusarium* species, the currently used carriers for mancozeb suffer from various deficiencies. For example, talc is known to cause talcosis and lung cancer. Talc may also include silica, which can cause silicosis and lung cancer. Talc is often found in proximity to asbestos and, consequently, often includes traces of asbestos, which is known to cause asbestosis, mesothelioma, and lung cancer and may increase the risk of cancers of the digestive system.

As another example, bark flour generates undesirable amounts of dust, or airborne particles. In the absence of mancozeb, bark flour can increase dry rot severity, which suggests that bark flour can reduce the effectiveness of mancozeb in preventing *Fusarium* dry rot.

Compost from manure may carry herbicides, which may detrimentally affect the ability of potato seeds to grow potato plants. Compost may also cause some respiratory irritation. Further, poorly composted material could harbor diseases that may affect plant growth or the suitability of the potatoes for consumption, as well as the seeds of weeds, which may affect plant growth.

Other diseases also threaten crops. For example, the fungus *Alternaria solani* causes early blight in potatoes and diseases in other crops, such as tomatoes and mustard. The fungus-like organism *Phytophthora infestans* causes late blight, which affects the foliage and tubers of potato plants, as well as diseases in tomatoes, eggplant, and other crops. Species of *Dickeya* and *Pectobacterium* bacteria cause aerial stem rot and blackleg in potato plants and tuber soft rot in the tubers of potato plants.

SUMMARY

A treatment for crops, such as crops of potatoes, other tubers, tomatoes, mustard, eggplants, etc., includes the use of spent lime (precipitated calcium carbonate (PCC)), which is considered to be non-toxic. The spent lime may be spent lime from the processing of sugar beets or sugar cane, which spent lime may be referred to as "sugar lime." The spent lime may be used as a treatment against pathogens that affect crops, or it may serve as a carrier for an antimicrobial treatment. For example, the spent lime may serve as a carrier for a fungicide (e.g., mancozeb, etc.), for an antibiotic, or for any other antimicrobial agent. Various aspects relating to the use of spent lime to treat potatoes and other tubers (e.g., against *Fusarium* dry rot, etc.), and other crops against microorganisms that cause plant diseases, are disclosed.

In one aspect, a composition for treating crops (e.g., crops of potatoes, other tubers, tomatoes, mustard, eggplants, etc.) includes spent lime. The composition may be formulated to prevent microbial diseases of the crops. For example, the composition may be formulated to prevent *Fusarium* dry rot in potatoes and/or other tubers. The spent lime may prevent *Fusarium* species of fungi from infecting the flesh of the tuber. More specifically, the spent lime may effectively cauterize damage to the skin of the tuber to prevent the *Fusarium* species of fungi from infecting the flesh of the tuber. As other examples, the composition may prevent other microbial crop diseases, such as aerial vine rot, early blight, late blight, aerial stem rot, black leg, soft rot, or the like.

In embodiments where the composition is formulated to prevent *Fusarium* dry rot in potatoes, the composition may also include a fungicide, such as mancozeb. In such embodiments, the spent lime may serve as a carrier for the fungicide. The carrier may include spent lime alone or in combination with one or more other carriers (e.g., compost, talc, etc.). While the spent lime may prevent the fungus from infecting the flesh of the tuber, a fungicide may reduce the fungal population on the potato, further decreasing the likelihood that the fungus will infect the flesh of the potato. The fungicide may comprise any effective amount of the composition (e.g., 6%, by weight, is typical for mancozeb, etc.). In a specific embodiment, the active ingredients of a composition may include about 6%, by weight, of mancozeb and about 94%, by weight, of spent lime (i.e., a weight ratio of about 94:6).

The composition may be in a powdered form. A powdered composition may be coated onto a tuber, such as by dusting the tuber with the powdered composition, by placing the tuber into a quantity of the powdered composition and tumbling the tuber and the powdered composition, or the like. A powdered composition may similarly be applied to seeds of other plants or dusted onto the plants themselves.

Alternatively, the composition may be in a liquid form. As an example, the active ingredients of the composition may be dissolved, suspended in, or otherwise carried by a suitable liquid carrier (e.g., water, etc.). The liquid composition may be applied to the tuber in any suitable manner, such as by washing a tuber, seeds, etc., with a volume of the liquid composition (e.g., by quickly immersing the tuber in the liquid composition, etc.), spraying the liquid composition onto the tuber, seeds, etc. (e.g., as a sheet, a stream, a spray, an aerosol, etc.), spraying the liquid composition onto plants (e.g., individual plants, crops, etc.), or the like.

In another aspect, a method of preventing pathogenic diseases of crops may include applying spent lime with an antimicrobial agent (e.g., a fungicide, an antibiotic, etc.) to seeds and/or plants. In a specific embodiment, the spent lime may be applied to a tuber (e.g., seed potatoes, etc.). Application may include applying a composition that includes the spent lime with the at least one component or ingredient (e.g., a fungicide, such as mancozeb, etc.; compost, talc, etc.; etc.) to the seeds or plants, in which case the spent lime and the at least one additional component(s) or ingredient(s) may be simultaneously applied to the seeds or plants.

Alternatively, the spent lime may be applied to the seeds or plants separately from any other treatments (e.g., fungicide, compost, talc, etc.). The spent lime may be adhered as a solid (e.g., a powder, etc.) or as a liquid (e.g., an aerosol, etc.). When applied as a solid, the spent lime adheres well to moisture, which enables it to be focused onto damaged areas (e.g., cuts, bruises, etc.) of a seed (e.g., a seed potato, etc.) or plant, where it can prevent a microorganism (e.g., *Fusarium* species of fungi, etc.) from infecting the flesh of the seed or plant. In embodiments where the spent lime is applied to tubers, the application of at least about 1 pound of spent lime to 100 pounds of tubers (e.g., potatoes, etc.) may prevent dry rot of the tubers in storage. Such a method may be used on seed (e.g., seed potatoes, etc.), stored tubers, and/or tubers designated for processing and/or "fresh" consumption.

Other aspects of the disclosed subject matter, as well as features and advantages of various aspects of the disclosure, should become apparent to those of ordinary skill in the art through consideration of the disclosure and the appended claims.

DETAILED DESCRIPTION

Figure 1A:
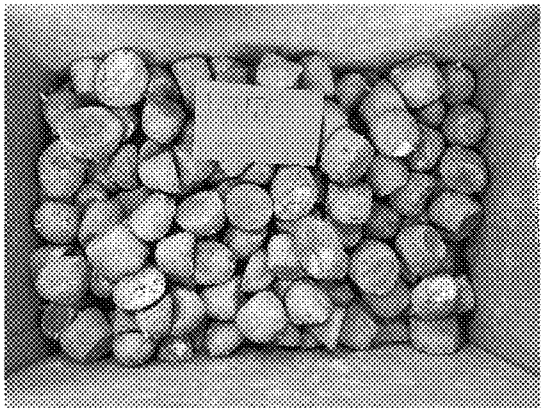
FIG. 1A is an image of a batch of untreated seed potatoes that have been cut and inoculated with *F. sambucinum;*

The following description provides information on studies that have been performed to demonstrate the effectiveness of spent lime, or sugar lime, alone and with fungicide to prevent infection by *Fusarium* species.

Example 1—Seed Treatment Box Test

A study was conducted to evaluate the efficacy of using spent lime to manage *Fusarium* dry rot on seed potatoes (i.e., cut pieces of potato) relative to other techniques for managing *Fusarium* dry rot. This study is referred to as a "box test."

The following treatments were prepared: control (untreated) (Trt 1); talc (Trt 2); bark (Trt 3); spent lime (Trt 4); compost (Trt 5); spent lime+compost (Trt 6); talc+Penncozeb (Trt 7); bark+Penncozeb (Trt 8); spent lime+Penncozeb (Trt 9); compost+Penncozeb (Trt 10); spent lime+compost+Penncozeb (Trt 11); talc+bark (Trt 12); talc+bark+Penncozeb (Trt 13). In treatments where Penncozeb was used (i.e. Trt 7, Trt 8, Trt 9, Trt 10, Trt 11, and Trt 13), the Penncozeb was added to the base substance(s), or carrier(s), to provide a treatment with 6% wt/wt Penncozeb. In treatments with two base substances, or carriers (i.e., Trt 6, Trt 11, Trt 12, and Trt 13), equal amounts of the base substances were combined.

The talc is available from Magris Performance Materials Inc., doing business as MAGRIStalc, of Toronto, Canada. The "bark" used in the study was Douglas fir bark flour, available from The Willamette Valley Company, LLC, of Eugene, Oregon, as AGRI-FIL Premium Fir Bark Flour. The spent lime was obtained from Amalgamated Sugar Company of Paul, Idaho. The spent lime is a byproduct of sugar production that was dried and screened with a fine mesh sieve to produce a fine powder that contains small amounts of nitrogen, potassium, and phosphorus. The compost is composted dairy cattle manure and is referred to as "dairy manure compost." The compost was ground to a fine powder. Penncozeb refers to the fungicide zinc manganese ethylene-bis-dithiocarbamate, which is commonly referred to as mancozeb, available from United Phosphorus, Inc., of Kingstree, South Carolina, as Penncozeb 80 WP.

Potato cultivar (cv.) Russet Burbank potatoes saved from the 2022 growing season were cut to provide the seed potatoes. The potatoes were cut with a commercial Better Built potato seed cutter, available from All Star Manufacturing and Design, LLC of Orem, Utah.

On the same day the seed potatoes were cut, they were inoculated with *Fusarium sambucinum* that had been isolated from an infected potato. Conidia (asexual reproductive spores of the fungus) were scraped from a culture growing on potato dextrose agar (PDA). The resulting suspension of macroconidia was adjusted to a concentration of $3\times10^6$ macroconidia/ml.

Each test included placing twenty-five (25) pounds of the cut seed potatoes into a cement mixer from which baffles had been removed. While tumbling the seed potatoes, ten (10) milliliters (ml) of the *F. sambucinum* inoculum was applied to the seed potatoes. Thus, the proportion of inoculum to seed potatoes was 0.4 ml/lb. Application of the inoculum resulted in inoculation of about $3.0\times10^7$ conidia/25 lb. seed, or $1.2\times10^6$ conidia/lb. seed. Specifically, the inoculum was sprayed on or misted onto the seed potatoes. More specifically, the inoculum was applied to the seed potatoes using an adjustable spray gun, such as that available from Harbor Freight Tools USA, Inc., as CENTRAL PNEUMATIC® Adjustable Mini Detail Spray Gun, set to a low pressure setting. Inoculation of the seed potatoes took about 20 seconds.

After inoculating the seed potatoes, tumbling continued for about another 10 seconds. Except for the control batch (Trt 1), a treatment was then applied to each batch of inoculated seed potatoes. One fourth of a pound (0.25 lb, 4 oz.) of each treatment was applied to its corresponding batch of seed potatoes. Stated another way, each treatment was applied to the seed potatoes at a weight ratio of 1:100 (e.g., one pound (lb.) treatment to 100 lb. (or 1 cwt) of seed potatoes). The seed potatoes and treatment tumbled for about 60 seconds, making the total inoculation and treatment time about 90 seconds.

The untreated (control) batch of seed potatoes received the same treatment conditions; i.e., they were tumbled for a total of about 90 seconds.

Each batch of inoculated, treated seed potatoes was then stored in 50 lb. capacity fresh pack boxes at ambient shop conditions (i.e., 55° F. to 65° F., 35% to 60% relative humidity (RH)) until evaluation. The batch of inoculated, untreated seed potatoes was stored in the same manner and under the same conditions.

After nineteen (19) days in storage, each batch of seed potatoes was evaluated for the incidence and severity of dry rot. Four groups of twenty (20) randomly selected seed potato pieces (eighty (80) total seed potato pieces) were selected from each batch, as shown in FIGS. 1A through 1M, and then evaluated. The evaluation of each seed potato piece included slicing off approximately 4 mm of a previously cut surface, as shown in FIGS. 2A through 2M, then visually evaluating the newly exposed surface. The severity of seed piece decay was estimated using the Wiersema criteria, which uses a 0-3 scale, for which FIG. 3 provides a reference and in which:

0=no decay;

1=mild decay (less than 25% of the cut surface shows symptoms of dry rot);

2=moderate decay (25-50% of the cut surface shows symptoms of dry rot); and

3=severe decay (>50% of the cut surface shows symptoms of dry rot).

The average incidence of dry rot, or the severity of dry rot, was calculated using the following formula:

$$\text{Severity} = \frac{(x_1) + (x_2 \times 2) + (x_3 \times 3)}{20 \times 3} \times 100,$$

where $x_1$ is the number of seed potatoes that exhibited mild decay, $x_2$ is the number of seed potatoes that exhibited moderate decay, and $x_3$ is the number of seed potatoes that exhibited severe decay. The formula is a weighted average of the severity scores, expressed as a value between 0 and 100. For example, if none of the seed potatoes exhibited any decay ($x_1$=0, $x_2$=0, and $x_3$=0) the severity index would be a 0; if all of the seed potatoes exhibited mild decay ($x_1$=20, $x_2$=0, and $x_3$=0), the severity index would be 33⅓; if all of the seed potatoes exhibited moderate decay ($x_1$=0, $x_2$=20, and $x_3$=0), the severity index would be 66⅔; and if all of the seed potatoes exhibited moderate decay ($x_1$=0, $x_2$=0, and $x_3$=20), the severity index would be 100.

The following results were obtained:

TABLE 1

| Description | | *Fusarium* Dry Rot-Seed Piece Decay | | | | | | |
|---|---|---|---|---|---|---|---|---|
| Trt | Treatment | Incidence | % 0 or 1 | Severity | % 0 | % 1 | % 2 | % 3 |
| 1 | Untreated | 100 a | 28 d | 63 bc | 1 e | 26 bcd | 54 ab | 17 bc |
| 2 | Talc | 100 a | 20 d | 68 b | 0 e | 20 d | 55 ab | 24 b |
| 3 | Bark | 100 a | 8 e | 84 a | 0 e | 6 e | 33 c | 59 a |
| 4 | Spent Lime | 100 a | 38 c | 60 c | 1 e | 36 bc | 42 bc | 20 bc |
| 5 | Compost | 100 a | 25 d | 65 bc | 0 e | 23 cd | 57 ab | 18 bc |
| 6 | Compost + Spent Lime | 100 a | 19 d | 65 bc | 0 e | 18 d | 68 a | 13 c |
| 7 | Talc + Penncozeb | 42 c | 96 ab | 15 e | 57 c | 38 b | 2 de | 0 d |
| 8 | Bark + Penncozeb | 64 b | 90 b | 25 d | 35 d | 54 a | 9 d | 0 d |
| 9 | Spent Lime + Penncozeb | 25 e | 98 ab | 10 f | 73 a | 23 cd | 1 e | 0 d |
| 10 | Compost + Penncozeb | 39 cd | 96 ab | 14 ef | 61 bc | 35 bc | 2 de | 0 d |
| 11 | Spent Lime + Compost + Penncozeb | 27 e | 100 a | 9 f | 72 ab | 27 bcd | 0 e | 0 d |
| 12 | Talc + Bark | 100 a | 8 e | 80 a | 1 e | 5 e | 42 bc | 50 a |
| 13 | Bark + Talc + Penncozeb | 29 de | 99 ab | 10 ef | 71 ab | 27 bcd | 0 e | 0 d |
| LSD P = .05 | | 1.3-10.4 | 9.9 | 5.8 | 2.1-12.0 | 8.2-14.8 | 5.8-19.0 | 8.5-14.7 |
| Standard Deviation | | 4.5t | 6.9 | 4.1 | 0.5t | 6.0t | 7.8t | 0.7t |

TABLE 1-continued

| Description | | Fusarium Dry Rot-Seed Piece Decay | | | | | | |
|---|---|---|---|---|---|---|---|---|
| Trt | Treatment | Incidence | % 0 or 1 | Severity | % 0 | % 1 | % 2 | % 3 |
| CV | | 6.92t | 12.48 | 9.28 | 12.37t | 19.96t | 28.26t | 22.74t |
| Grand Mean | | 65.1t | 55.6 | 43.8 | 4.1t | 29.8t | 27.5t | 3.1t |
| Treatment Prob(F) | | 0.0001 | 0.0001 | 0.0001 | 0.0001 | 0.0001 | 0.0001 | 0.0001 |

Means followed by same letter or symbol do not differ significantly (P = .05, LSD).
t = Mean descriptions are reported in transformed data units and are not de-transformed.
Mean comparisons performed only when AOV Treatment P(F) is significant at mean comparison OSL.

All data were analyzed by analysis of variance (ANOVA) using Agricultural Research Manager (ARM) 2023. When the treatment effect was significant (P<0.10; see "Treatment Prob (F)" at the bottom row of the table), mean separation was performed using Fisher's Least Significant Difference (LSD). Means followed by the same lowercase letter or a dash are not statistically different when compared to each other. If the treatment variances were not homogeneous as determined by Levene's test for equal variance, or exhibit skewness or kurtosis, means were transformed prior to analysis. Back-transformed data are listed in the results.

Figure 2A:
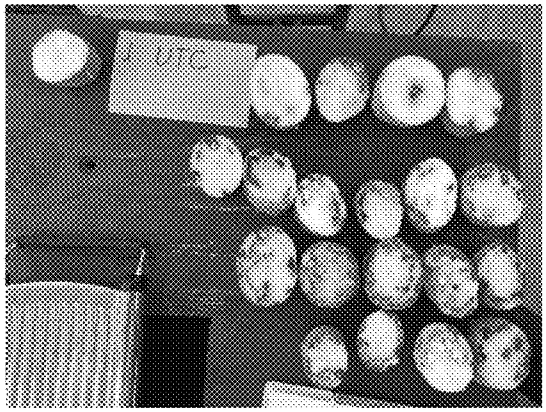
FIGS. 2A-2M are images of selected seed potatoes from the batches depicted by FIGS. 1A-1M, respectively, from which the treated surfaces were cut and then evaluated to for decay caused by the *F. sambucinum*.
Figure 1B:
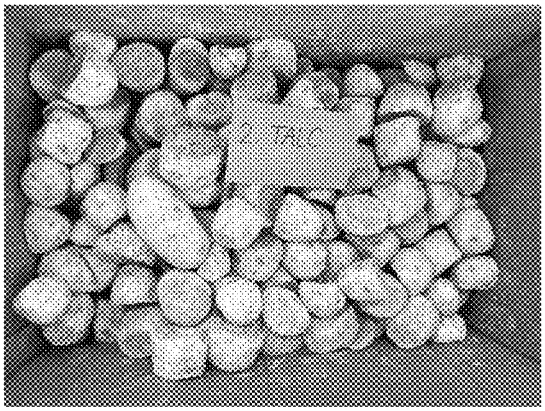
FIGS. 1B-1M are images of batches of seed potatoes that were cut, inoculated with *F. sambucinum*, and then coated with various treatments.
Figure 2B:
Figure 1C:
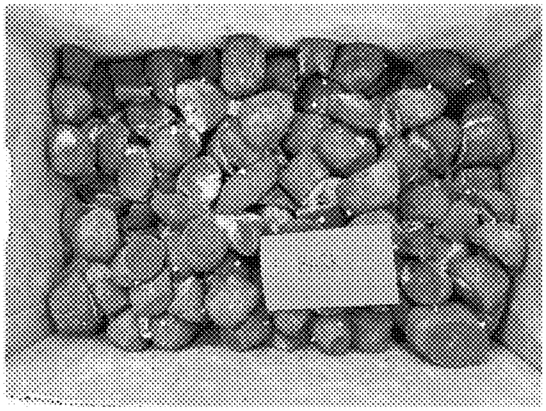
Figure 2C:
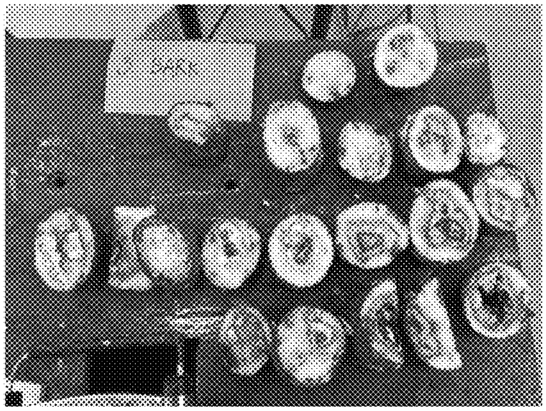
Figure 1D:
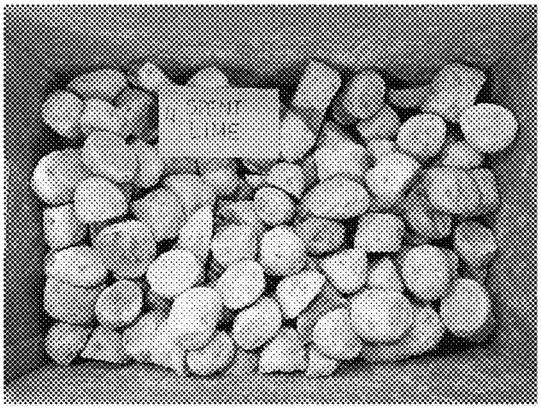
Figure 2D:
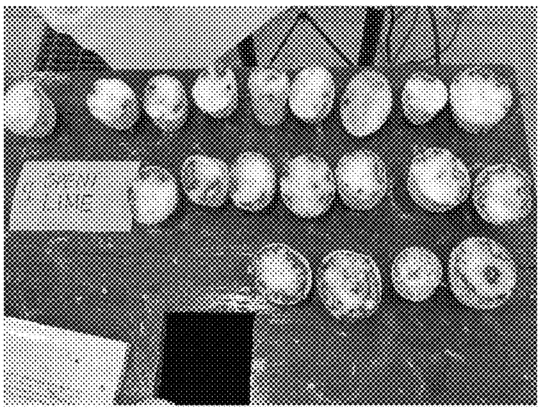
Figure 1E:
Figure 2E:
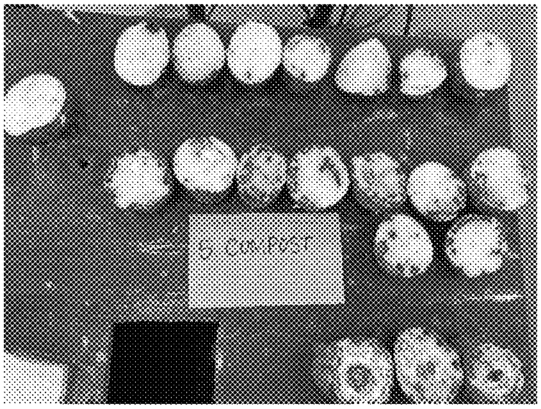
Figure 1F:
Figure 2F:
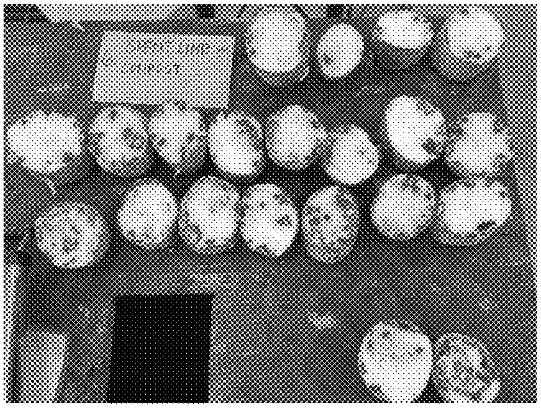
Figure 1G:
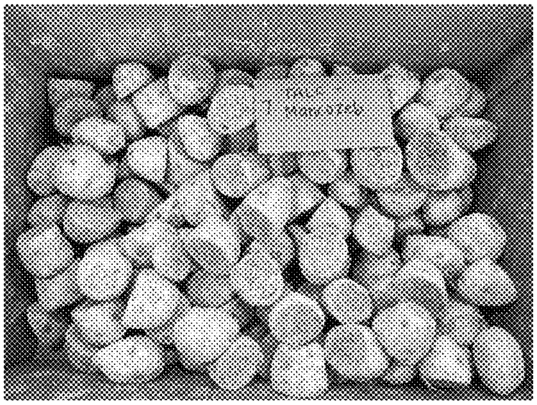
Figure 2G:
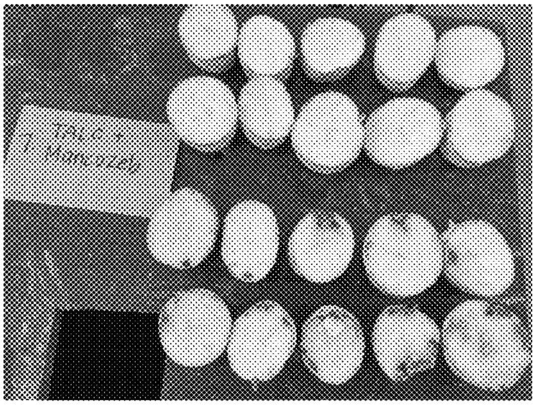
Figure 1H:
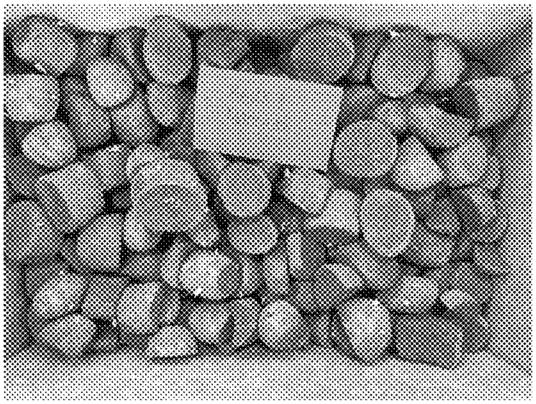
Figure 2H:
Figure 1I:
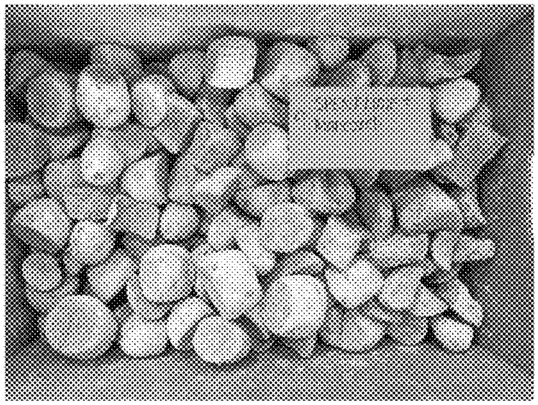
Figure 2I:
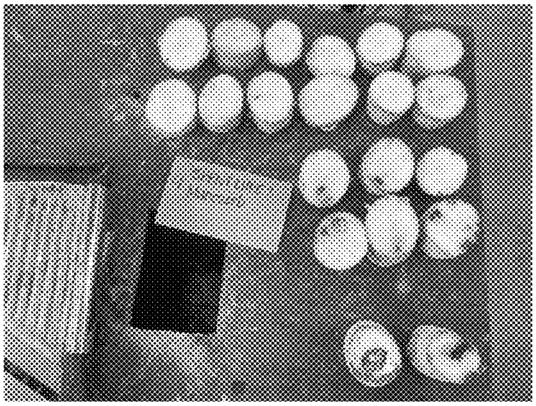
Figure 1J:
Figure 2J:
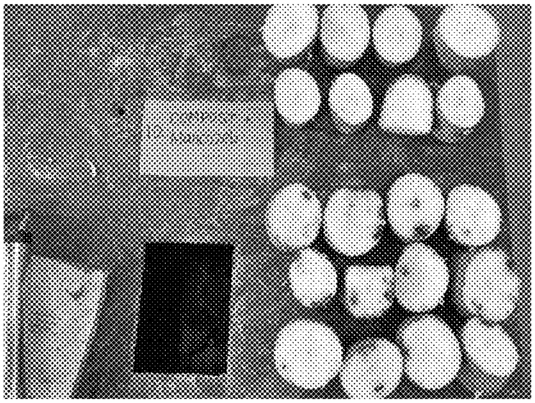
Figure 1K:
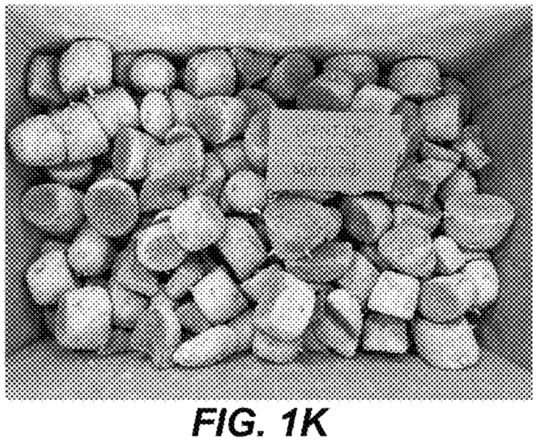
Figure 3:
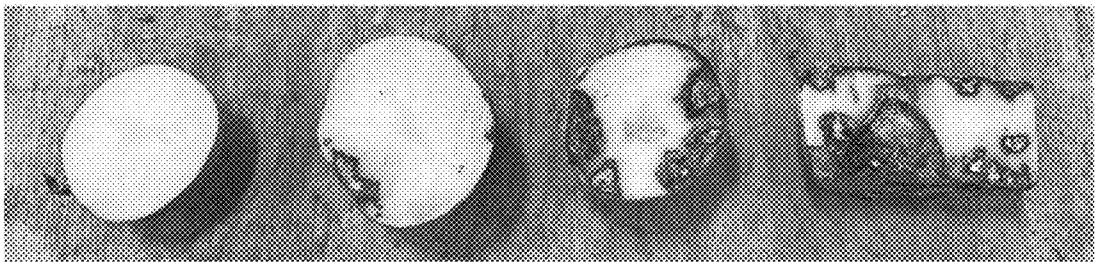
FIG. 3 is an image that provides a reference for various levels of severity of decay caused by the *F. sambucinum.*

From images in FIGS. 2A-2F and 2L and the data corresponding to Trt 1-Trt 6 and Trt 12, all of the seed potatoes that were treated without mancozeb were 100% infected. Of these treatments, dry rot was least severe in the seed potatoes treated with spent lime (FIG. 2D, Trt 4).

Figure 2K:
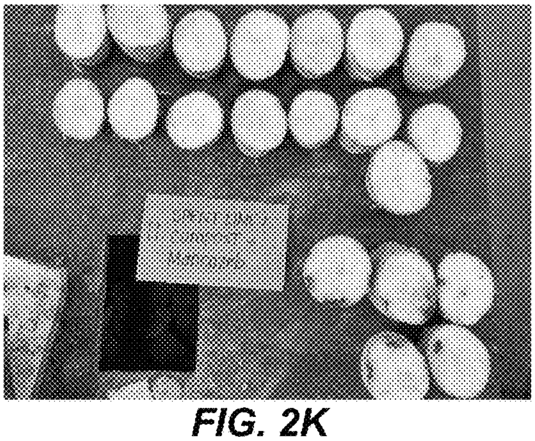
Figure 1L:
Figure 2L:
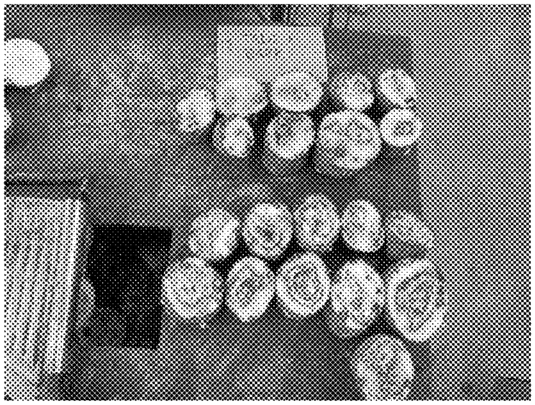
Figure 1M:
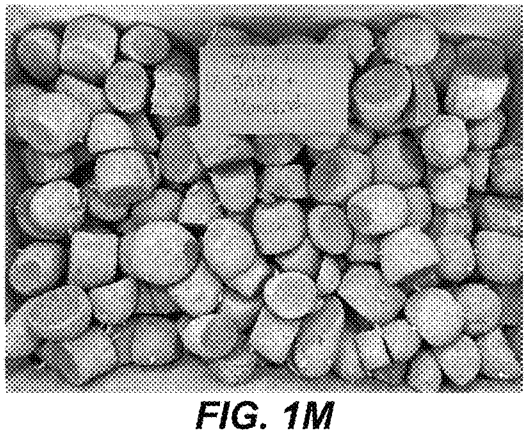
Figure 2M:
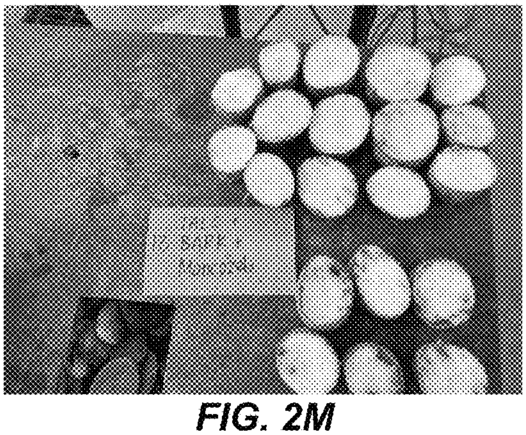

The most effective treatments for preventing dry rot in seed potatoes were spent lime with mancozeb (FIG. 2I, Trt 9) and a combination of spent lime and compost with mancozeb (FIG. 2K, Trt 11). Seed potatoes treated with spent lime and mancozeb had the lowest incidence of decay from dry rot, with only about 25% of the seed potatoes exhibiting decay. Seed potatoes treated with spent lime and mancozeb also had the least sever decay from dry rot.

The least effective treatments for preventing dry rot in seed potatoes involved the use of bark. The treatment with bark alone (i.e., no mancozeb) (FIG. 2C, Trt 3) and the treatment with a combination of bark and talc, but no mancozeb (FIG. 2L, Trt 12) actually increased the severity of decay in seed potatoes over that exhibited by the untreated seed potatoes (FIG. 2A, Trt 1). These treatments also resulted in a much greater percentage of seed potatoes exhibiting severe decay (a decay rating of 3) than the percentage of severe decay seen with all of the other treatments and the untreated seed potatoes. Decay destroyed the entire centers of some of the seed potatoes that were subjected to these treatments. In addition, the treatment with bark and mancozeb (FIG. 2H, Trt 8) exhibited more overall decay and more serious decay than all the other treatments that included mancozeb (FIGS. 2G, 2I, 2J, 2K, and 2L; Trt 7, Trt 9, Trt 10, Trt 11, and Trt 12).

Notably, when talc was combined with bark as a carrier for mancozeb (Trt 13), seed potatoes treated with the mixture (see FIG. 2M) exhibited almost as little decay as the seed potatoes treated with spent lime and mancozeb (Trt 9) and seed potatoes treated with spent lime, compost, and mancozeb (Trt 11). Mixing talc or compost with bark may also reduce some of the dust problems associated with bark.

Example 2—Seed Treatment Field Trial

A second study was conducted to evaluate the effects of different treatments for seed potatoes on the growth of potato plants. This study is referred to as a "field trial."

The following treatments were prepared: control (untreated) (Trt 1); talc+Penncozeb (Trt 7); bark+Penncozeb (Trt 8); spent lime+Penncozeb (Trt 9); compost+Penncozeb (Trt 10); spent lime+compost+Penncozeb (Trt 11); talc+bark+Penncozeb (Trt 13); spent lime+bark+Penncozeb (Trt 14); and talc+compost+Penncozeb (Trt 15). In treatments with two base substances, or carriers (i.e., Trt 11, Trt 12, Trt 13, Trt 14, and Trt 15), equal amounts of the base substances were combined. Each treatment included 6% wt/wt Penncozeb.

The talc is available from Magris Performance Materials Inc., doing business as MAGRIStalc, of Toronto, Canada. The "bark" used in the study was Douglas fir bark flour, available from The Willamette Valley Company, LLC, of Eugene, Oregon, as AGRI-FIL Premium Fir Bark Flour. The spent lime was obtained from Amalgamated Sugar Company of Paul, Idaho. The spent lime is a byproduct of sugar production that was dried and screened with a fine mesh sieve to produce a fine powder that contains small amounts of nitrogen, potassium, and phosphorus. The compost is composted dairy cattle manure and is referred to as "dairy manure compost." The compost was ground to a fine powder. Penncozeb refers to the fungicide zinc manganese ethylene-bis-dithiocarbamate, which is commonly referred to as mancozeb, available from United Phosphorus, Inc., of Kingstree, South Carolina, as Penncozeb 80 WP.

Seven days prior to planting (on Apr. 18, 2023), potato cultivar (cv.) Russet Burbank certified seed potatoes from the 2022 growing season were cut to provide the seed potatoes. The potatoes were cut with a commercial Better Built potato seed cutter, available from All Star Manufacturing and Design, LLC of Orem, Utah.

On the day the seed potatoes were cut, the untreated, inoculated seed potatoes (Trt 1) and each batch of treated, inoculated seed potatoes were prepared by placing 48 pounds of the cut seed potatoes into a cement mixer from which baffles had been removed. While tumbling the seed potatoes, twenty (20) milliliters (ml) of *F. sambucinum* inoculum with a concentration of $1\times10^6$ conidia/ml was applied to the cut seed potatoes. Thus, the proportion of inoculum to seed potatoes was about 0.42 ml/lb. Application of the inoculum resulted in inoculation of about $2\times10^7$ conidia/48 lb. seed, or $4.17\times10^5$ conidia/lb. seed. Specifically the inoculum was misted onto the seed potatoes while tumbling the seed potatoes for about 20 seconds. More specifically, the inoculum was applied to the seed potatoes using a syringe fitted with a TeeJet 11001VS nozzle available from TeeJet Technologies of Glendale Heights, Illinois.

After applying the inoculum, the seed potatoes were tumbled for another 10 seconds. A treatment was added to each batch of the inoculated seed potatoes to be treated at a rate of 1 lb/cwt. The treated seed potatoes (i.e., with treatments Trt 7-11 and Trt 13-15) were allowed to tumble for an additional 60 seconds, making the total tumbling time 90 seconds.

The untreated (control) batch of seed potatoes received the same treatment conditions; i.e., they were tumbled for another 60 seconds, for a total tumbling time of about 90 seconds.

Each batch of the seed potatoes was then stored in a 50 lb. capacity fresh pack box at ambient shop conditions (55° F. to 65° F., 35% to 60% RH) for seven days, until planting.

After 7 days in storage (on Apr. 25, 2022), a test crop was planted. The test crop included several test plots. Each test plot corresponded to a batch of seed potatoes and included about 28 lb. of seed potatoes distributed in four rows (i.e., about 7 lb. of seed potatoes per row). The test crop was grown under typical conditions (time, location, watering schedule, etc.). Once the test crop was planted, each test plot was evaluated periodically. Specifically, the number of emerged plants, or plant stand—any green plant tissue visible above the surface of the ground—was counted in the middle two rows of each four-row test plot. These evaluations were conducted five times, at 21 days after planting (on May 16, 2022), 24 days after planting (on May 19, 2022), 27 days after planting (on May 22, 2022), 29 days after planting (on May 24, 2022), and 31 days after planting (on May 26, 2022).

If the emergence data were plotted on a graph, the area under the resulting emergence progress curve (AUEPC). AUEPC may be calculated using the following formula:

$$AUEPC = \sum_{i}^{n-1}\left(\frac{Y_i + Y_{i+1}}{2}\right)(t_{i+1} - t_i),$$

where Y=the number of emerged plants at time i, t=the evaluation time (in days), and n=the number of assessment times. Stated another way, the percentages of emergence for two successive evaluations are added together and divided by 2. This value is then multiplied by the number of days between the two evaluations. This calculation is done for the stand counts on the first two evaluations, and then for the stand counts on the second and third evaluations, the stand counts on the third and fourth evaluations, and the stand counts on the fourth and fifth evaluations. A standardized AUEPC (sAUEPC) was calculated by dividing the AUEPC by the number of evaluation days to obtain the AUEPC units per day. The sAUEPC provides a single value that can be used to compare the emergence data to emergence data from other trials.

The following table includes the data collected during the field study and the SAUEPC data for each test plot.

TABLE 2

| Rating Date<br>Days After Planting (DAP) | | # Emerged Plants/30 Row-FT | | | | | |
|---|---|---|---|---|---|---|---|
| Description | | May 16 | May 19 | May 22 | May 24 | May 26 | |
| Trt | Treatment | 21 | 24 | 27 | 29 | 31 | sAUEPC |
| 1 | Untreated check | 3.0 ab | 11.8 abc | 24.3- | 26.5- | 26.5- | 18.0 ab |
| 7 | Talc Penncozeb | 1.3 cd | 10.5 bcd | 22.0- | 25.3- | 25.8- | 16.5 bc |
| 8 | Bark Penncozeb | 1.3 cd | 10.0 bcd | 23.5- | 26.0- | 26.0- | 16.9 bc |
| 9 | Sugar Lime Penncozeb | 0.3 d | 7.3 d | 22.5- | 25.3- | 26.3- | 15.5 c |
| 10 | Compost Penncozeb | 1.8 bc | 12.3 abc | 22.3- | 24.5- | 25.3- | 16.9 bc |
| 11 | Sugar Lime Compost Penncozeb | 1.8 bc | 15.0 a | 22.5- | 25.0- | 26.5- | 18.0 ab |
| 13 | Talc Bark Penncozeb | 1.3 cd | 9.0 cd | 21.3- | 25.5- | 26.3- | 15.9 bc |
| 14 | Sugar Lime Bark Penncozeb | 1.3 cd | 13.0 ab | 23.0- | 26.0- | 26.0- | 17.6 abc |
| 15 | Talc Compost Penncozeb | 3.3 a | 14.5 a | 26.0- | 27.5- | 27.8- | 19.6 a |
| LSD P = .10 | | 1.42 | 3.41 | 3.03 | 2.52 | 2.17 | 2.14 |
| Standard Deviation | | 1.17 | 2.82 | 2.50 | 2.08 | 1.79 | 1.77 |
| CV | | 70.47 | 24.55 | 10.87 | 8.1 | 6.82 | 10.27 |
| Grand Mean | | 1.67 | 11.47 | 23.03 | 25.72 | 26.25 | 17.22 |
| Treatment Prob(F) | | **0.0371** | **0.0118** | 0.3034 | 0.6562 | 0.7807 | **0.0900** |

Means followed by the same letter or a dash do not differ significantly (P = 0.10, LSD).

Mean comparisons performed only when ANOVA Treatment Prob (F) is significant at the pre-determined mean comparison level (<0.10).

Significant values are bolded.

From these data, most of the treatments (all except Trt 15) initially appeared to have a negative effect on growth of potato plants when compared with the plants grown from untreated, inoculated potato seeds (Trt 1). By the third evaluation, there were no significant differences in the number of plants that had grown from the different batches of potato seeds. Some new plants appeared in each test batch during the third, fourth, and fifth evaluations.

Example 3—Second Seed Treatment Box Test

Approximately 20 lb. of potato seed from each batch was left after planting each treatment. These samples were reserved for further testing, including a second box test and an evaluation of suberization of the cut surfaces of the seed potatoes, by storing them at ambient shop conditions (i.e., 55° F. to 65° F., 35% to 60% relative humidity (RH)). Thirty-five (35) days after planting and 42 days after cutting, inoculation, and treatment (if any treatment was applied) (on May 23, 2022), each reserved sample of seed potatoes was evaluated for the incidence and severity of dry rot. Four groups of twenty (20) randomly selected seed potato pieces (eighty (80) total seed potato pieces) were selected from each batch and then evaluated. The evaluation of each seed potato piece included slicing off approximately 4 mm of a previously cut surface, then visually evaluating the newly exposed surface. The severity of seed piece decay was estimated using the Wiersema criteria, which employs a 0-3 scale, for which FIG. 3 provides a reference and in which:

0=no decay;

1=mild decay (less than 25% of the cut surface shows symptoms of dry rot);

2=moderate decay (25-50% of the cut surface shows symptoms of dry rot); and

3=severe decay (>50% of the cut surface shows symptoms of dry rot).

The average incidence of dry rot, or the severity of dry rot, was calculated using the following formula:

$$\text{Severity} = \frac{(x_1) + (x_2 \times 2) + (x_3 \times 3)}{20 \times 3} \times 100,$$

where $x_1$ is the number of seed potatoes that exhibited mild decay, $x_2$ is the number of seed potatoes that exhibited moderate decay, and $x_3$ is the number of seed potatoes that exhibited severe decay. The formula is a weighted average of the severity scores, expressed as a value between 0 and 100. For example, if none of the seed potatoes exhibited any decay ($x_1$=0, $x_2$=0, and $x_3$=0) the severity index would be a 0; if all of the seed potatoes exhibited mild decay ($x_1$=20, $x_2$=0, and $x_3$=0), the severity index would be 33⅓; if all of the seed potatoes exhibited moderate decay ($x_1$=0, $x_2$=20, and $x_3$=0), the severity index would be 66⅔; and if all of the seed potatoes exhibited moderate decay ($x_1$=0, $x_2$=0, and $x_3$=20), the severity index would be 100.

The following results were obtained from the second box test:

TABLE 3

| Description | | *Fusarium* Dry Rot | | |
|---|---|---|---|---|
| | | Incidence | 0 or 1 | Severity Index |
| Rating | Unit | % | % | 0-100 |
| Trt | Treatment | | | |
| 1 | Untreated | 29 ab | 85 b | 16 b |
| 7 | Talc + Penncozeb | 19 c | 94 a | 9 cd |
| 8 | Bark + Penncozeb | 35 a | 71 c | 26 a |
| 9 | Spent Lime + Penncozeb | 9 d | 95 a | 5 d |
| 10 | Compost + Penncozeb | 21 bc | 89 ab | 13 bc |
| 11 | Spent Lime + Compost + Penncozeb | 20 bc | 85 b | 13 bc |
| 13 | Talc + Bark + Penncozeb | 24 bc | 84 b | 16 b |
| 14 | Spent Lime + Bark + Penncozeb | 21 bc | 88 ab | 13 bc |

TABLE 3-continued

| Description | | *Fusarium* Dry Rot | | |
|---|---|---|---|---|
| | | Incidence | 0 or 1 | Severity Index |
| Rating | Unit | % | % | 0-100 |
| 15 | Talc + Compost + Penncozeb | 25 bc | 82 b | 16 b |
| LSD P = .10 | | 9.72 | 7.85 | 6.327 |
| Standard Deviation | | 8.03 | 6.49 | 5.230 |
| CV | | 35.7 | 7.56 | 36.92 |
| Grand Mean | | 22.50 | 85.83 | 14.167 |
| Treatment Prob(F) | | **0.0124** | **0.0017** | **0.0011** |

Means followed by the same letter or a dash do not differ significantly (P = 0.10, LSD).
Mean comparisons performed only when ANOVA Treatment Prob (F) is significant at the pre-determined mean comparison level (<0.10). Significant values are bolded.
This test represents the box test of seed potatoes that were not used during planting.

The only treatment that significantly reduced the incidence and severity of decay in seed potatoes in the second box test was the treatment that included spent lime and mancozeb (Trt 7). In comparing the seed potatoes treated with spent lime and mancozeb (Trt 9) with the seed potatoes treated with talc and mancozeb (Trt 7), the incidence of decay was more than half (9% vs. 19%) and the severity of decay was almost half (5 vs. 9).

The only treatment that increased the severity of decay in the seed potatoes was bark and mancozeb (Trt 8). The addition of either spent lime (Trt 14) or talc (Trt 15) to the bark eliminated the negative effect of bark as a fungicide carrier, but did not decrease the incidence or severity of decay to levels comparable with the incidence and severity of decay where spent lime was used as the only fungicide carrier (Trt 7). When compost was added to the spent lime as the fungicide carrier (Trt 11), the incidence and severity of decay also increased.

Example 4—Field Decay Test

Fifty (50) days after the test crop was planted (on Jun. 14, 2022), field decay readings were made. In the field decay readings, potatoes from each test batch of the test crop were cut and dry rot decay was evaluated as the percent of the freshly cut surface that exhibited decay, as described previously herein in reference to the box tests. The incidence of decay from dry rot, the severity of decay, and a weighted severity of decay.

The following table provides data from the field decay test, including the incidence of decay in newly grown potatoes from the test crop, the overall severity of decay from dry rot in the newly grown potatoes, and the weighted severity of the decay:

TABLE 4

| Description | | *Fusarium* Dry Rot | | |
|---|---|---|---|---|
| | | Incidence | Severity Index | Weighted Severity |
| Rating | Unit | % | 0-100 | 0-100 |
| Trt | Treatment | | | |
| 1 | Untreated check | 58 a | 14 a | 25 a |
| 7 | Talc + Penncozeb | 9 bc | 1 bcd | 5 b |

TABLE 4-continued

| Description | | Fusarium Dry Rot | | |
|---|---|---|---|---|
| | | Incidence | Severity Index | Weighted Severity |
| Rating | Unit | % | 0-100 | 0-100 |
| 8 | Bark + Penncozeb | 22 b | 3 b | 13 ab |
| 9 | Spent Lime + Penncozeb | 10 bc | 1 bc | 12 ab |
| 10 | Compost + Penncozeb | 1 d | 0.1 d | 0.6 c |
| 11 | Spent Lime + Compost + Penncozeb | 2 cd | 0.5 cd | 0.9 c |
| 13 | Talc + Bark + Penncozeb | 25 b | 3 b | 12 ab |
| 14 | Spent Lime + Bark + Penncozeb | 22 b | 1.6 bc | 7 b |
| 15 | Talc + Compost + Penncozeb | 9 bc | 0.9 cd | 4 bc |
| LSD P = .10 | | 8.28-22.06 | 1.19-7.54 | 3.35-17.83 |
| Standard Deviation | | 10.56t | 0.26t | 0.41t |
| CV | | 47.17t | 59.49t | 48.3t |
| Grand Mean | | 22.38t | 0.44t | 0.85t |
| Treatment Prob(F) | | **0.0002** | **0.0002** | **0.0041** |

Means followed by the same letter or a dash do not differ significantly (P = 0.10, LSD). Mean comparisons performed only when ANOVA Treatment Prob (F) is significant at the pre-determinedmean comparison level (<0.10). Significant values are bolded.

From these data, it is apparent that potatoes grown with each of the tested treatments had less decay, in terms of incidence and severity, than potatoes grown from inoculated, untreated potato seeds (Trt 1). The lowest incidence and severity of decay were seen in potatoes grown from seed potatoes treated with a mixture of compost and mancozeb (Trt 10). That treatment and the treatment in which spent lime and compost were used as a carrier for mancozeb (Trt 11), provided similar results, while the treatment that included talc and compost as a carrier for mancozeb (Trt 15) also provided promising results.

Example 5—Evaluation of Cut Surface Suberization

During *Fusarium* evaluations it was apparent that there were differences in the amount of cut surface suberization. Suberization of cut surfaces of potatoes is a process of forming a waxy layer on the cut surface to prevent water loss and protect the tuber from infection. During suberization, a waxy material called suberin is formed; the suberin is typically formed within hours of cutting the surface. In addition, a new skin layer called the phellogen or periderm forms around the suberin layer.

Suberization of the remaining seed potatoes from each batch was evaluated by using a torque meter to estimate the thickness of suberization on the cut surfaces. Higher torque readings indicated thicker suberized surfaces. A final evaluation was made by simply counting the number seed pieces with decay. The data from these evaluations are included in the following table:

TABLE 5

| Description | | Torque | % |
|---|---|---|---|
| Trt | Treatment | Reading | Decayed |
| 1 | Untreated check | 1.68 e | 30 bc |
| 7 | Talc + Penncozeb | 1.91 cd | 25 cd |
| 8 | Bark + Penncozeb | 1.82 cde | 44 a |
| 9 | Spent Lime + Penncozeb | 1.38 f | 9 e |
| 10 | Compost + Penncozeb | 1.99 bc | 14 de |
| 11 | Spent Lime + Compost + Penncozeb | 2.10 b | 25 cd |
| 13 | Talc + Bark + Penncozeb | 1.78 de | 21 cd |
| 14 | Spent Lime + Bark + Penncozeb | 1.67 e | 39 ab |
| 15 | Talc + Compost + Penncozeb | 2.32 a | 20 cde |
| LSD P =.10 | | 0.183 | 11.76 |
| Standard Deviation | | 0.151 | 9.72 |
| CV | | 8.2 | 38.68 |
| Grand Mean | | 1.847 | 25.14 |
| Treatment Prob(F) | | **0.0001** | **0.0007** |

Means followed by the same letter or a dash do not differ significantly (P = 0.10, LSD). Mean comparisons performed only when ANOVA Treatment Prob (F) is significant at the pre-determined mean comparison level (<0.10). Significant values are bolded.

The three treatments that included compost as a fungicide carrier (Trt 10, Trt 11, and Trt 15) had the highest torque readings and, therefore, the highest degree of suberization. The degree of suberization of the cut surfaces of the treatments that included compost was noticeable to the naked eye. The entire cut surfaces of potato seeds treated with compost could be removed as single units and were so thick that the suberization that had been removed could be snapped in two. Each of these treatments (Trt 10, Trt 11, and Trt 15) resulted in less decay than the decay seen in the untreated seed potatoes (Trt 1). Interestingly, the treatment that included spent lime and mancozeb (Trt 9) had the least suberization, but significantly less decay than the three treatments that included compost (Trt 10, Trt 11, and Trt 15).

Consistent with the studies summarized in this document, two of the treatments that included bark (Trt 8 and Trt 14) exhibited more decay than that seen in the untreated seed potatoes (Trt 1). The results indicate that bark is not a suitable for use as a carrier for fungicides that kill *Fusarium.*

Overall, treatments that included spent lime and talc adhered well to the cut surfaces of the seed potatoes, with treatments that included spent lime performing as well as or better than treatments that included talc, while avoiding the hazards associated with the use of talc (e.g., asbestosis, mesothelioma, lung cancer, cancers of the digestive system, etc.).

An embodiment of a liquid suspension of spent lime may include spent lime particles having an average size (e.g., diameter, etc.) of 200 microns. Such a suspension may be used to aerially apply spent lime to a crop at a rate of about one pound spent lime per acre of crop.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A composition for controlling *Fusarium* dry rot in tubers, comprising:

spent lime from sugar production; and mancozeb.

2. The composition of claim 1, comprising about 6%, by weight, of the mancozeb and about 94%, by weight, of the spent lime.

3. A method for controlling *Fusarium* dry rot in tubers, comprising:

applying spent lime from sugar production to the tubers; and applying mancozeb to the tubers.

4. The method of claim 3, wherein applying the spent lime and applying the mancozeb are conducted concurrently.

5. The method of claim 3, wherein applying the spent lime and applying the mancozeb comprises applying a composition comprising the spent lime and the mancozeb.

6. The method of claim 3, wherein applying the spent lime and applying the mancozeb comprises applying the spent lime and applying the mancozeb at a weight ratio of about 94:6 mancozeb:spent lime.

7. The method of claim 3, wherein applying the spent lime comprises dusting the spent lime onto the tubers.

8. The method of claim 3, wherein applying the spent lime comprises applying a solution comprising the spent lime onto the tubers.

9. The method of claim 3, wherein applying the spent lime to the tubers comprises applying the spent lime to seed potatoes.

10. The method of claim 3, wherein applying the spent lime to the tubers comprises applying the spent lime to tubers prior to storing the tubers.

11. The method of claim 3, wherein applying the spent lime to the tubers comprises applying the spent lime to the tubers before distributing the tubers for processing or sale to consumers.

12. A method for controlling or treating pathogenic disease in a crop, comprising:

applying spent lime from sugar production to the crop; and applying mancozeb to the crop.

13. The method of claim 12, wherein the spent lime comprises a carrier for the mancozeb.

14. The method of claim 12, wherein applying the spent lime comprises applying the spent lime to seeds used to grow the crop.

15. The method of claim 12, wherein applying the spent lime comprises applying the spent lime to plants of the crop.

* * * * *